United States Patent
Chou et al.

(10) Patent No.: US 9,886,147 B2
(45) Date of Patent: Feb. 6, 2018

(54) ELECTRONIC DEVICES, ELECTRONIC DEVICE SUITES, AND METHODS FOR OPERATING USER INTERFACE

(71) Applicant: Acer Incorporated, New Taipei (TW)

(72) Inventors: Po-Hung Chou, New Taipei (TW); Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 201 days.

(21) Appl. No.: 14/735,426

(22) Filed: Jun. 10, 2015

(65) Prior Publication Data
US 2016/0154498 A1    Jun. 2, 2016

(30) Foreign Application Priority Data

Dec. 1, 2014  (TW) .............................. 103141561 A (51) Int. Cl.
*G06F 3/044* (2006.01)

(52) U.S. Cl.
CPC .... *G06F 3/044* (2013.01); *G06F 2203/04104* (2013.01)

(58) Field of Classification Search
None
See application file for complete search history.

(56) References Cited

U.S. PATENT DOCUMENTS

| 7,176,902 B2 | 2/2007 | Peterson, Jr. et al. |
| 2010/0328236 A1 | 12/2010 | Ma |
| 2012/0188198 A1* | 7/2012 | Jeong ...................... G06F 3/044 345/174 |
| 2014/0104218 A1 | 4/2014 | Drader et al. |
| 2014/0137045 A1* | 5/2014 | Ding ................... G06F 3/04886 715/835 |

FOREIGN PATENT DOCUMENTS

| CN | 1864125 | 11/2006 |
| TW | 201101103 | 1/2011 |
| TW | 201349089 | 12/2013 |
| TW | M488234 | 10/2014 |

OTHER PUBLICATIONS

Chinese language office action dated Sep. 9, 2015, issued in application No. TW 103141561.
Chinese language office action dated Nov. 25, 2015, issued in application No. TW 103141561.

* cited by examiner

*Primary Examiner* — Nicholas Lee
(74) *Attorney, Agent, or Firm* — McClure, Qualey & Rodack, LLP (57) ABSTRACT

An electronic device includes a storage unit, a touch-sensing unit and a processing unit. The storage unit stores a plurality of combinations of at least two shapes. The touch-sensing unit detects the touch of a first touching object and a second touching object while the electronic device is in an idle mode. The touch-sensing unit further generates a sensing signal when the capacitance values corresponding to the first touching object and the second touching object are within a predetermined range over a predetermined time, and the combination of the shapes of the first touching object and the second touching object conforms to one of the combinations stored in the storage unit. The processing unit enables an application program according to the sensing signal.

15 Claims, 8 Drawing Sheets

ELECTRONIC DEVICES, ELECTRONIC DEVICE SUITES, AND METHODS FOR OPERATING USER INTERFACE

CROSS REFERENCE TO RELATED APPLICATIONS

This Application claims priority of Taiwan Patent Application No. 103141561, filed on Dec. 1, 2014, the entirety of which is incorporated by reference herein.

BACKGROUND OF THE INVENTION

Field of the Invention

The application relates in general to an electronic device, an electronic device suite, and a method for operating a user interface, and in particular to an electronic device, an electronic device suite, and a method for operating a user interface for enabling a particular application program in an idle mode by the touches of at least two touching objects.

Description of the Related Art

These days, due to the rapid development of technology, electronic devices are used widely. When a user wants to enable different application programs in different situations, such as listening music, recording an exercise path while exercising, or using a navigation mode and maps while traveling, the application program must be enabled before the electronic device enters the idle mode, or the application program must be re-enabled when the electronic device switches from the idle mode to the normal mode, and that might cause inconvenience for the user. Thus, how to simplify the steps for enabling a particular application program in different situations is a problem which needs to be solved immediately.

BRIEF SUMMARY OF INVENTION

An embodiment of the invention provides an electronic device, comprising a storage unit, a touch-sensing unit, and a processing unit. The storage unit stores a plurality of combinations of at least two shapes. The touch-sensing unit detects the touch of a first touching object and a second touching object in an idle mode, and generates a first sensing signal when the capacitance values corresponding to the first touching object and the second touching object are within a predetermined range over a predetermined time, and the combination of the shapes of the first touching object and the second touching object conform to one of the combinations stored in the storage unit. The processing unit enables a first application program according to the first sensing signal.

Another embodiment of the invention provides an electronic device, comprising a storage unit, a touch-sensing unit, and a processing unit. The storage unit stores a plurality of combinations of at least two shapes. The touch-sensing unit detects the touch of a first touching object and a second touching object in an idle mode, and obtains object information corresponding to the first touching object and the second touching object. The object information comprises shapes, capacitance values, and contact times corresponding to the first touching object and the second touching object. The processing unit receives the object information, and enables a first application program when the capacitance values corresponding to the first touching object and the second touching object are within a predetermined range, the contact times are over a predetermined time, and the combination of the shapes of the first touching object and the second touching object conform to one of the combinations stored in the storage unit.

Another embodiment of the invention provides a method for operating a user interface, adapted to an electronic device, the steps comprising: creating a database, which is configured to store a plurality of combinations of at least two shapes; detecting the touch of a first touching object and a second touching object in an idle mode; obtaining shapes, capacitance values, and contact times corresponding to the first touching object and the second touching object; determining whether the combination of the shapes of the first touching object and the second touching object conform to one of the combinations stored in the database or not when the capacitance values corresponding to the first touching object and the second touching object are within a predetermined range, and the contact times are over a predetermined time; generating a first sensing signal when the combination of the shapes of the first touching object and the second touching object conform to one of the combinations stored in the database; receiving the first sensing signal by a processing unit; and enabling a first application program.

Another embodiment of the invention provides a method for operating a user interface, adapted to an electronic device, the steps comprising: creating a database, which is configured to store a plurality of combinations of at least two shapes; detecting the touch of a first touching object and a second touching object in an idle mode; obtaining object information corresponding to the first touching object and the second touching object, wherein the object information comprises shapes, capacitance values, and contact times corresponding to the first touching object and the second touching object; receiving the object information by a processing unit; determining whether the combination of the shapes of the first touching object and the second touching object conform to one of the combinations stored in the database or not when the capacitance values corresponding to the first touching object and the second touching object are within a predetermined range, and the contact times are over a predetermined time; enabling a first application program when the combination of the shapes of the first touching object and the second touching object conform to one of the combinations stored in the database.

Another embodiment of the invention provides an electronic device suite, comprising a protective case and an electronic device. The protective case comprises a front cover and a back cover. The front cover comprises a first sensing object and a second sensing object. The first sensing object is coupled to the second sensing object by a conductive element. The back cover is coupled to the front cover. The electronic device is arranged on the front cover and comprises a storage unit, a touch-sensing unit, and a processing unit. The storage unit stores a plurality of combinations of at least two shapes. The touch-sensing unit detects the touch of a first touching object and a second touching object in an idle mode, and generates a sensing signal when the capacitance values corresponding to the first touching object and the second touching object are within a predetermined range over a predetermined time, and the combination of the shapes of the first touching object and the second touching object conform to one of the combinations stored in the storage unit. The processing unit enables an application program according to the sensing signal.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas in which the present devices and methods can be applied will become apparent from the following detailed description. It should be understood that the detailed description and specific examples, while indicating exemplary embodiments of the electronic devices, the electronic device suites, and the methods for operating the user interface, are intended for the purposes of illustration only and are not intended to limit the scope of the invention.

Figure 1:
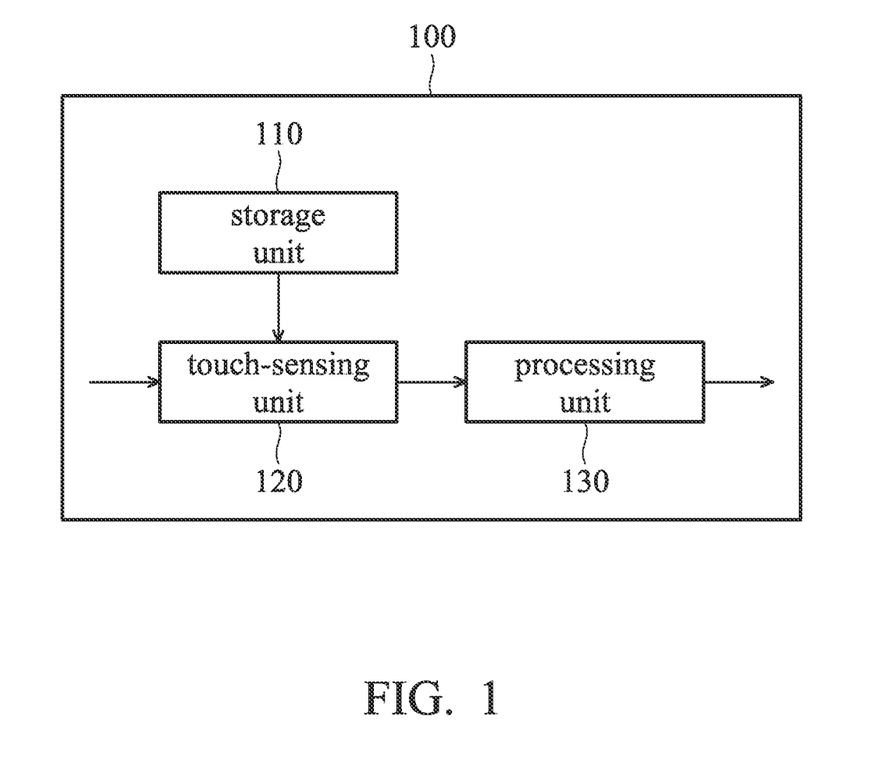
FIG. 1 is a block diagram of the electronic device in accordance with an embodiment of the invention.
Figure 2A:
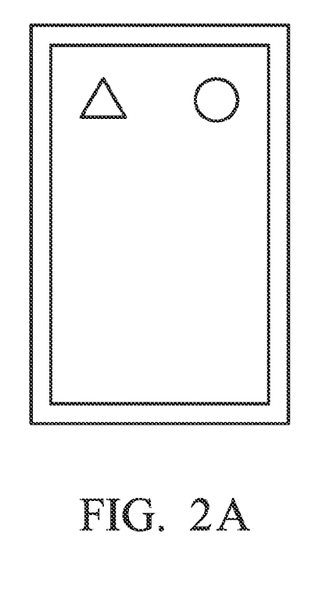
FIGS. 2A, 2B and 2C are schematic diagrams of the combinations of the shapes in accordance with some embodiments of the invention.
Figure 2B:
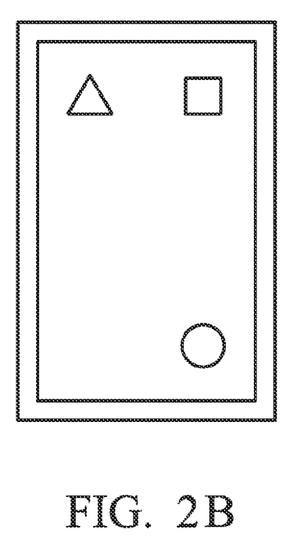
Figure 2C:
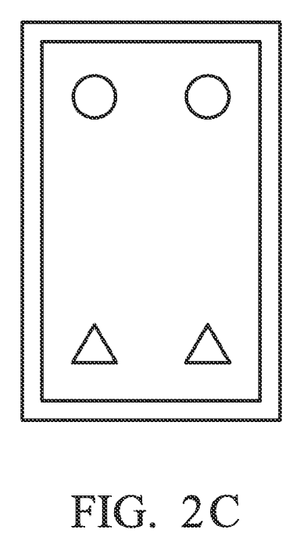

FIG. 1 is a block diagram of the electronic device in accordance with an embodiment of the invention. As shown in FIG. 1, the electronic device 100 includes a storage unit 110, a touch-sensing unit 120, and a processing unit 130. The electronic device 100 can be a personal digital assistant (PDA), a mobile phone, a smartphone, a notebook computer, a tablet, a game device, etc. The storage unit 110 stores a plurality of combinations of at least two shapes which can be the different outlines or the same outline. For example, FIGS. 2A, 2B, and 2C are schematic diagrams of the combinations of the shapes in accordance with some embodiments of the invention. The combinations shown in FIG. 2A are triangle and circle, the combinations shown in FIG. 2B are triangle, rectangle and circle, and the combinations shown in FIG. 2C are a set of triangles and a set of circles. It should be noted that the combinations as described above are the exemplary embodiment, but they are not limited thereto. The touch-sensing unit 120 detects the touch of the touching objects in the idle mode, and outputs a sensing signal. The processing unit 130 receives the sensing signal and enables the application program according to the sensing signal.

According to an embodiment of the present invention, the electronic device 100 enters the idle mode when the user covers the protective case on the electronic device 100, presses the power button, or the device is unused for a period of time. When the electronic device 100 is running in the idle mode, the touch-sensing unit 120 detects the touch of at least two touching objects, and obtains the object information of at least two objects. The object information includes the shape, capacitance value, and contact time corresponding to each touching object. When the capacitance value of each touching object is within a predetermined range, and the contact time is over a predetermined time (e.g. 2 seconds), the touch-sensing unit 120 further detects the shape of each touching object. For example, the capacitance of x and y direction of the sensing electrodes are varied when the touching object touches the touch-sensing unit 120, and the touch-sensing unit 120 obtains the shape of the touch object according to the boundary of the sensing electrodes of which the capacitance is varied. The touch-sensing unit 120 outputs a sensing signal corresponding to the combination of the shapes for waking up the processing unit 130 when the shapes of at least two touching objects conform to one of the combinations stored in the storage unit 110. For example, when the shapes of the touching objects are a triangle and circle, and the storage unit 110 has the combination of triangle and circle, the touch-sensing unit 120 determines that the shapes of the touching objects conform to one of the combinations stored in the storage unit 110. After receiving the sensing signal, the processing unit 130 executes the application program corresponding to the sensing signal, such as a multimedia player. It should be noted that different combinations of shapes correspond to different application programs. For example, the sensing signal corresponds to a multimedia player when the combination of shapes is triangle and circle, and the sensing signal corresponds to a recording program or the electronic device enters a flight mode when the combination of shapes is square and heart-shape.

Figure 3A:
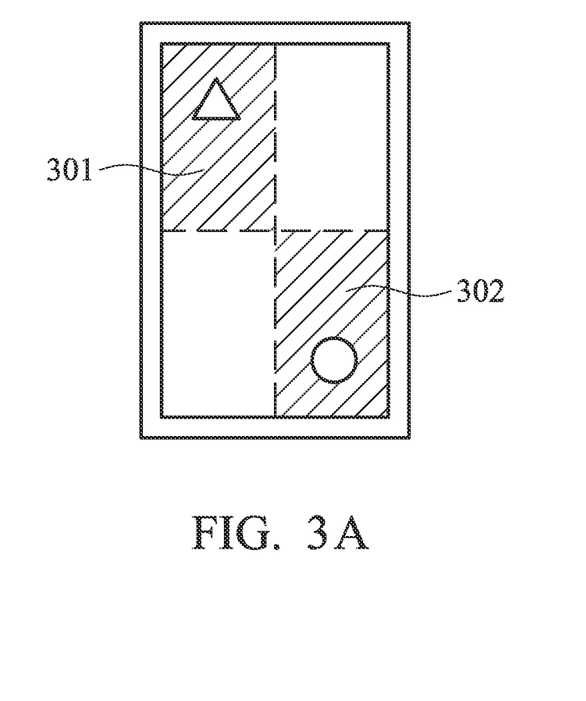
FIGS. 3A and 3B are schematic diagrams of different combinations of the shapes in accordance with some embodiments of the invention.
Figure 3B:
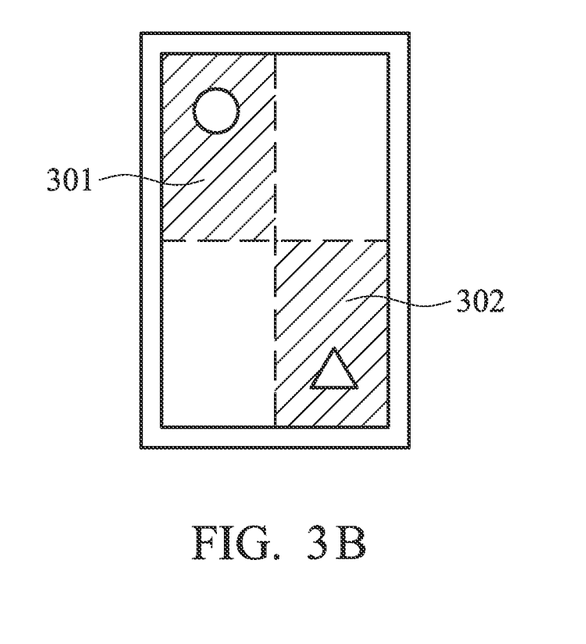

According to another embodiment, the information stored in the storage unit 110 further includes the locations of the shapes, and the touch-sensing unit 120 further outputs the sensing signal according to the locations of at least two touching objects. For example, the combinations of the shapes shown in FIGS. 3A and 3B are the combinations stored in the storage unit 110, and both of the combinations of the shapes are triangle and circle. However, due to the locations of the triangle and the circle being within the different predetermined area 301 and 302, the processing unit 130 enables different application programs according to different arrangements shown in FIGS. 3A and 3B. In the idle mode, the touch-sensing unit 120 further detects the location of each touching object and outputs the sensing signal when the combination of the shapes of the touching objects conform to one of the combinations of shapes stored in the storage unit 110. The processing unit 130 enables the application program according to the sensing signal corresponding to the locations and the combination of shapes.

According to another embodiment, when the electronic device 100 is running in the idle mode, the electronic device 100 may reduce power consumption by only detecting the touch of the touching objects on the predetermined areas 301 and 302 first, and then detecting the shapes of the touching objects after both of the predetermined areas 301 and 302 are touched by the touching objects.

According to another embodiment, after enabling the application program corresponding to the combination stored in the storage unit 110, when the touch-sensing unit 120 detects that the touching objects leave the electronic device 100, which means the variations of the capacitances are negative or the capacitances of at least two touching objects are lower than the predetermined range, the touch-sensing unit 120 outputs another sensing signal for notifying the processing unit 130 to execute another process. For example, after the touching objects leave the touch-sensing unit 120, the processing unit 130 disables the multimedia player and switches to the home page or enables a camera application program.

Figure 4:
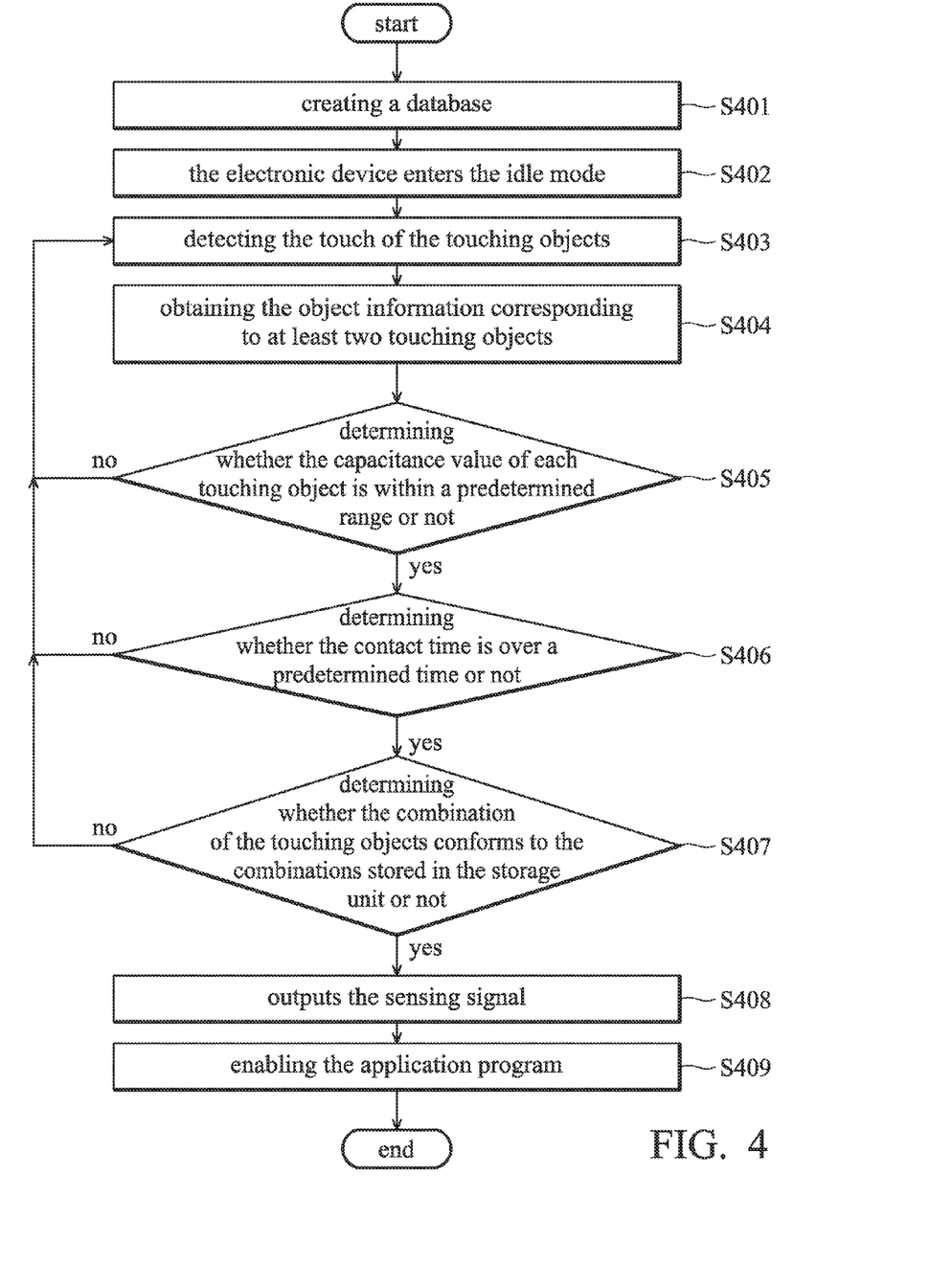
FIG. 4 is a flow chart of the method for operating the user interface in accordance with an embodiment of the invention.

Please refer to FIG. 4 with FIG. 1. FIG. 4 is a flow chart of the method for operating the user interface in accordance with an embodiment of the invention. In step S401, the storage unit 110 creates a database, which is configured to store a plurality of combinations of at least two shapes with different outlines or the same outline. In step S402, the electronic device 100 is running in the idle mode. In step S403, the touch-sensing unit 120 detects the touch of at least two touching objects. In step S404, the touch-sensing unit 120 further obtains the object information corresponding to at least two touching objects when the touch-sensing unit detects the touch of the touching objects. The object information includes the shape, capacitance value, and contact time corresponding to each touching object. In step S405, the touch-sensing unit 120 determines whether the capacitance value of each touching object is within a predetermined range or not. When the capacitance value of each touching object is within a predetermined range, the method proceeds to S406, and the touch-sensing unit 120 determines whether the contact time is over a predetermined time (e.g. 2 seconds) or not. If the contact time is over the predetermined time, the method proceeds to S407, and the touch-sensing unit 120 determines whether the combination of the touching objects conforms to the combinations stored in the storage unit 110 or not. If the combination of the touching objects does not conform to the combinations stored in the storage unit 110, the method returns to S403, and the touch-sensing unit 120 detects the touch of at least two touching objects again. Otherwise, the method proceeds to S408, and the touch-sensing unit 120 outputs the sensing signal corresponding to the combination of the shapes. In step S409, the processing unit 130 receives the sensing signal and enables the application program according to the sensing signal.

Figure 5:
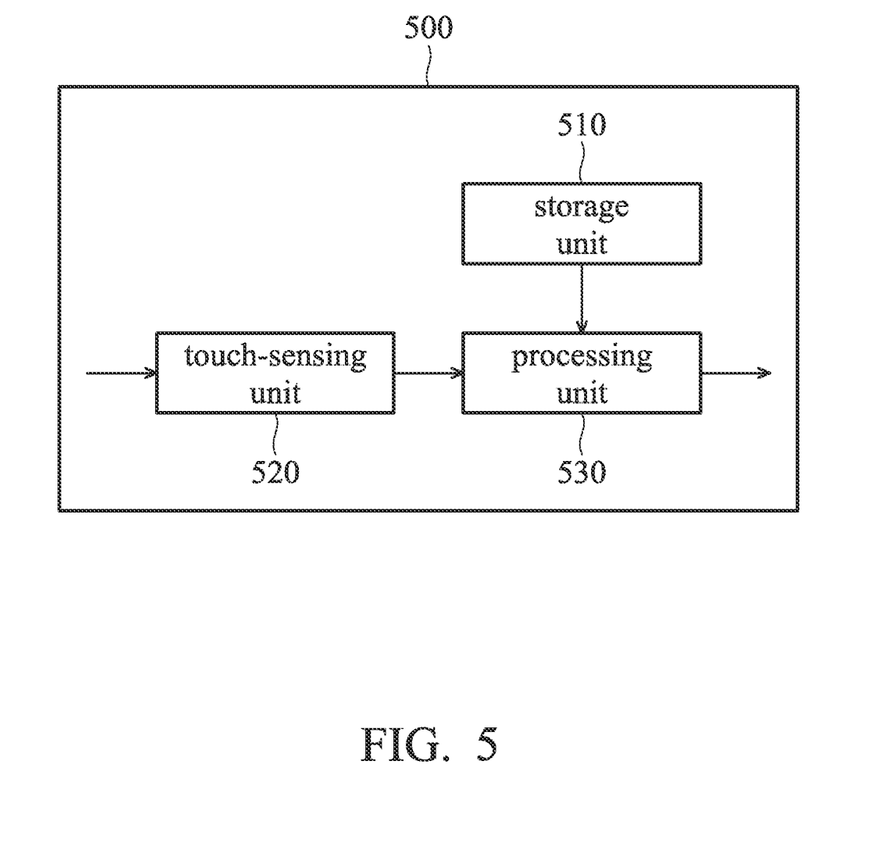
FIG. 5 is a block diagram of the electronic device in accordance with an embodiment of the invention.

FIG. 5 is a block diagram of the electronic device 400 in accordance with an embodiment of the invention. As shown in FIG. 5, the electronic device 500 includes the storage unit 510, the touch-sensing unit 520, and the processing unit 530. The storage unit 510 stores a plurality of combinations of at least two shapes. The combinations of at least two shapes are referred to the collocation of at least two shapes. The touch-sensing unit 520 detects the touch of at least two touching objects in the idle mode, and obtains the object information of each touching object. The object information includes the shape, capacitance value, and contact time corresponding to each touching object. The processing unit 530 receives object information, and enables the application program according to the object information.

According to an embodiment of the present invention, the electronic device 500 enters the idle mode when the user covers the protective case on the electronic device 500, presses the power button, or the device is unused for a period of time. When the electronic device 500 is running in the idle mode, the touch-sensing unit 520 detects the touch of at least two touching objects, and obtains the object information of at least two objects. After obtaining the object information of each touching object, the touch-sensing unit 520 outputs the object information to the processing unit 530. The processing unit 530 determines whether at least two touching objects conform to the conditions for enabling the application program or not according to the object information. For example, when the capacitance value of each touching object is within a predetermined range, the contact time is over a predetermined time (e.g. 2 seconds), and the combination of the shapes conforms to the combination stored in the storage unit 510, the processing unit 530 enables the application program corresponding to the combination stored in the storage unit 510, such as multimedia player, etc. It should be noted that different combinations of shapes correspond to different application programs. For example, the application program is a multimedia player when the combination of shapes is triangle and circle, and the application program is a recording program, or the electronic device enters the flight mode, when the combination of shapes is square and heart-shape.

According to another embodiment, the processing unit 530 further enables the application program according to the locations of at least two touching objects. For example, the combinations of the shapes shown in FIGS. 3A and 3B are the combinations stored in the storage unit 510, and both of the combinations are triangle and circle. However, due to the locations of the triangle and the circle being within the different predetermined area 301 and 302, the processing unit 530 enables different application programs according to the different arrangements shown in FIGS. 3A and 3B. When the processing unit 530 detects that the combination of shapes is triangle and circle, the processing unit 530 further determines whether or not the locations of the triangle and the circle conform to the arrangements shown in FIGS. 3A and 3B. If the locations of the triangle and the circle conform to one of the arrangements shown in FIGS. 3A and 3B, the processing unit 530 enables the application program according to the locations.

In the idle mode, the touch-sensing unit 120 further detects the location of each touching object and outputs the sensing signal when the combination of the shapes of the touching objects conform to one of the combinations of the shapes stored in the storage unit 110. The processing unit 130 enables the application program according to the sensing signal corresponding to the locations and the combination of the shapes.

According to another embodiment, when the electronic device 500 is running in the idle mode, the electronic device 500 may reduce power consumption by only detecting the touch of touching objects on the predetermined areas 301 and 302 first, and then detecting the shapes of the touching objects after both of the predetermined areas 301 and 302 are touched by the touching objects.

According to another embodiment, after enabling the application program corresponding to the combination stored in the storage unit 510, when the touch-sensing unit 520 detects that the touching objects leave the electronic device 500, which means the variations of the capacitances are negative or the capacitances of at least two touching objects are lower than the predetermined range, the processing unit 530 executes another process. For example, after the touching objects leave the touch-sensing unit 520, the processing unit 130 disables the multimedia player and switches to the home page or enables a camera application program.

Figure 6:
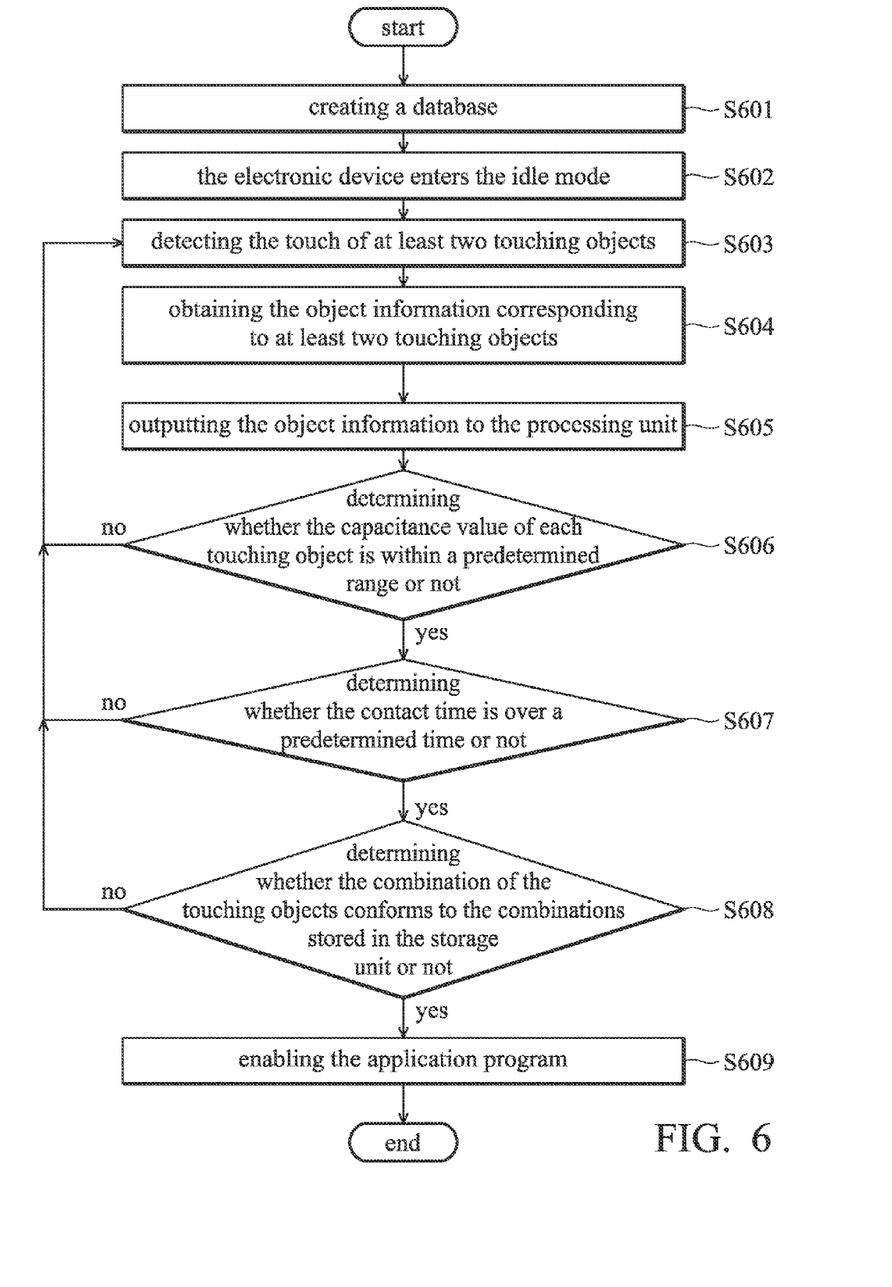
FIG. 6 is a flow chart of the method for operating the user interface in accordance with another embodiment of the invention.

Please refer to FIG. 6 with FIG. 5. FIG. 6 is a flow chart of the method for operating the user interface in accordance with an embodiment of the invention. In step S601, the storage unit 510 creates a database, which is configured to store a plurality of combinations of at least two shapes. In step S602, the electronic device 500 enters the idle mode. In step S603, the touch-sensing unit 520 detects the touch of at least two touching objects. In step S604, the touch-sensing unit 120 further obtains the object information corresponding to at least two touching objects. The object information includes the shape, capacitance value, and contact time corresponding to each touching object. In step S605, the touch-sensing unit 520 outputs the object information to the processing unit 530. After receiving the object information, the method proceeds to S606, the processing unit 530 determines whether the capacitance value of each touching object is within a predetermined range or not. When the capacitance value of each touching object is within a predetermined range, the method proceeds to S607, the touch-sensing unit 120 determines whether the contact time is over a predetermined time (e.g. 2 seconds) or not. If the contact time is over the predetermined time, the method goes to S608, and the processing unit 530 determines whether the combination of the touching objects conforms to the combinations stored in the storage unit 510 or not. If the combination of the touching objects does not conform to the combinations stored in the storage unit 510, the method returns to S603, and the touch-sensing unit 520 detects the touch of at least two touching objects again. Otherwise, the method proceeds to S609, and the processing unit 530 enables the application program according to the combination of shapes.

Figure 7:
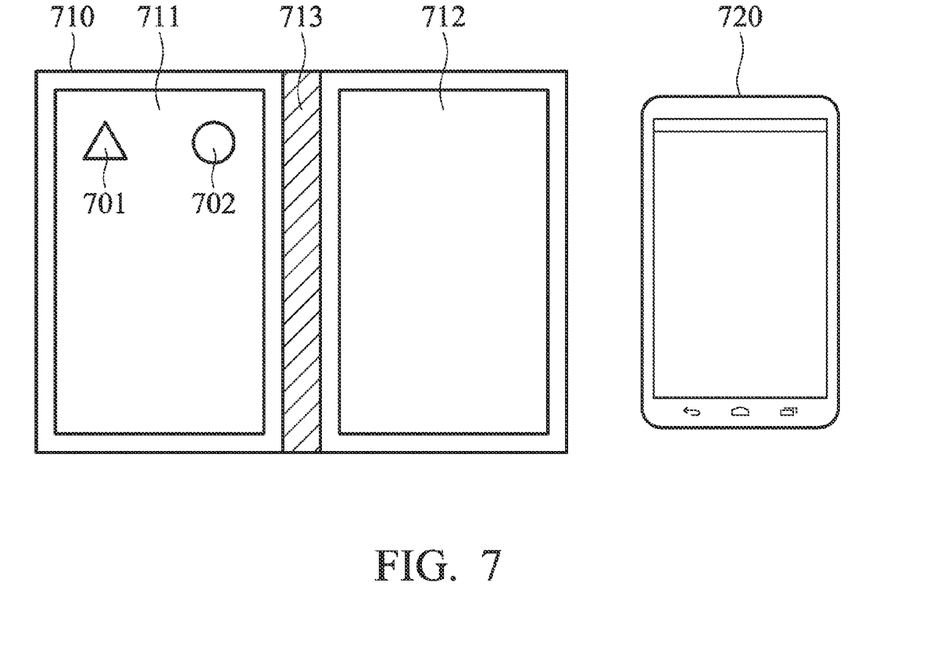
FIG. 7 is a schematic diagram of the electronic device suite in accordance with an embodiment of the invention.

FIG. 7 is a schematic diagram of the electronic device suite in accordance with an embodiment of the invention. As shown in FIG. 7, the electronic device suite 700 includes a protective case 710 and an electronic device 720. The protective case 710 includes a front cover 711, a back cover 712 and side piece 713. The front cover 711 includes at least two sensing objects 701, 702. The back cover 712 fits with the back cover of the electronic device 720 for fixing the electronic device 720. The side piece 713 connects the front cover 711 and the back cover 712. The electronic device 720 is folded in the front cover 711, the back cover 712 and the side piece 713. The electronic device 720 includes a storage unit, a touch-sensing unit and a processing unit. Since the functions of the storage unit, the touch-sensing unit, and the processing unit are the same as the elements of the electronic device 100 or the electronic device 500, they will not be described herein.

Figure 8:
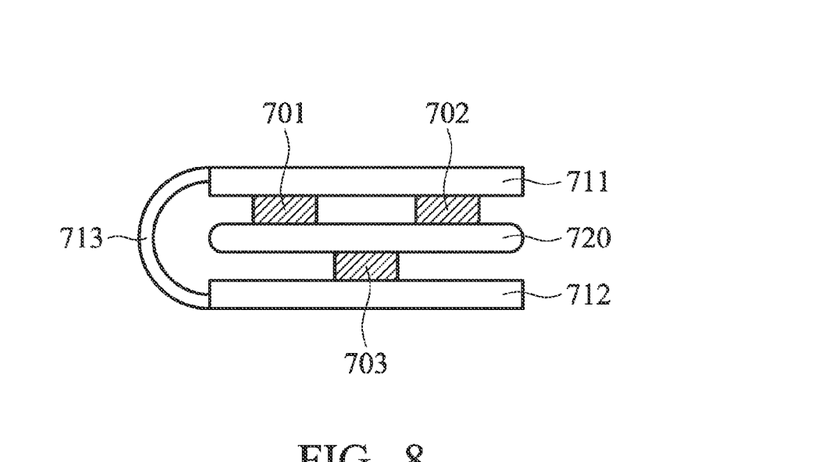
FIG. 8 is a side view of the electronic device suite in accordance with an embodiment of the invention.

According to an embodiment, the protective case 710 is the protective case of an electronic device. The substrate of the front cover 711 and the back cover 712 can be a hard material, such as glass or PMMA, and the substrate is covered by a soft material, such as leather or conductive fabric. The sensing objects 701, 702 are pasted on the front cover 711 by Velcro or a soft magnet, and covered by a soft material. The sensing objects 701, 702 protrude on the substrate or the area without another sensing object. For example, as shown in FIG. 8, when the front cover 711 covers the screen of the electronic device 720, the screen is touched only by the sensing object 701, 702. The sensing objects 701 and 702 are connected by a conductive material 705 for balancing the capacity of each sensing object for improving the accuracy of the touch-sensing unit. Furthermore, the front cover 711 also includes a sensing magnet (not shown). The sensing magnet triggers the sensor of the electronic device 720 to make the electronic device 720 enter the idle mode when the front cover 711 covers the electronic device 720.

Figure 9:
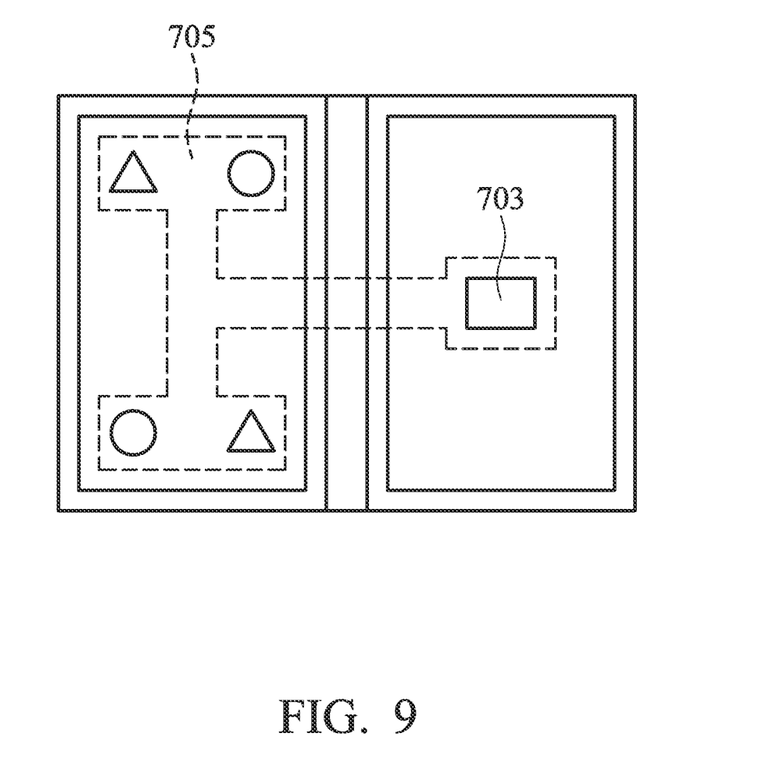
FIG. 9 is a schematic diagram of the electronic device suite in accordance with another embodiment of the invention.

FIG. 9 is a schematic diagram of the electronic device suite in accordance with another embodiment of the invention. As shown in FIG. 9, the back cover 712 also includes at least one sensing object 703, the sensing object 703 connects to the sensing objects 701, 702 on the front cover 711 by the conductive material 705, and further connects to the ground of the electronic device 720 for increasing the capacitances of the sensing objects 701 and 702.

As described above, an embodiment of the invention provides an electronic device, an electronic device suite, and a method for operating a user interface. When the electronic device enters the idle mode, the user can use at least two sensing object with two different shapes or different locations for enabling a particular application program, and can enable another application program the same way when the electronic device enters the normal mode. In addition, the arrangement of the sensing objects can be changed to enable different application programs in different situations. And the conductive material connected between the sensing objects is used to reduce the probability of misjudgment for improving the user experience.

It will be apparent to those skilled in the art that various modifications and variations can be made to the disclosed structure without departing from the scope or spirit of the invention. In view of the foregoing, it is intended that the present invention covers modifications and variations of this invention, provided they fall within the scope of the following claims and their equivalents.

What is claimed is:

1. An electronic device, comprising:
a storage unit, configured to store a plurality of combinations of at least two shapes;
a touch-sensing unit, configured to detect touches of a first touching object and a second touching object in an idle mode, and generate a first sensing signal when the capacitance values corresponding to the first touching object and the second touching object are within a predetermined range over a predetermined time, and the combination of the shapes of the first touching object and the second touching object conform to one of the combinations stored in the storage unit; and
a processing unit, configured to enable a first application program according to the first sensing signal;
wherein after the first application program is enabled, the processing unit further disables the first application program and enables a second application program when the touch-sensing unit detects that the capacitance values are lower than the predetermined range.

2. The electronic device as claimed in claim 1, wherein the touch-sensing unit generates a second sensing signal when the capacitance values corresponding to the first touching object and the second touching object are within the predetermined range over the predetermined time, and the combination of the shapes of the first touching object and the second touching object conform to another combination stored in the storage unit, and the processing unit enables a third application program according to the second sensing signal.

3. The electronic device as claimed in claim 1, wherein the touch-sensing unit further generates the first sensing signal according to the locations of the first touching object and the second touching object.

4. An electronic device, comprising:
a storage unit, configured to store a plurality of combinations of at least two shapes;
a touch-sensing unit, configured to detect touches of a first touching object and a second touching object in an idle mode, and obtain object information corresponding to the first touching object and the second touching object, wherein the object information comprises shapes, capacitance values, and contact times corresponding to the first touching object and the second touching object; and
a processing unit, configured to receive the object information, and enable a first application program when the capacitance values corresponding to the first touching object and the second touching object are within a predetermined range, the contact times are over a predetermined time, and the combination of the shapes of the first touching object and the second touching object conform to one of the combinations stored in the storage unit;

wherein after the first application program is enabled, the processing unit further disables the first application program and enables a second application program when the touch-sensing unit detects that the capacitance values are lower than the predetermined range.

5. The electronic device as claimed in claim 4, wherein the processing unit enables a third application program when the capacitance values corresponding to the first touching object and the second touching object are within a predetermined range, the contact times are over the predetermined time, and the combination of the shapes of the first touching object and the second touching object conform to another combination stored in the storage unit.

6. The electronic device as claimed in claim 4, wherein the touch-sensing unit further enables the first application program according to the locations of the first touching object and the second touching object.

7. A method for operating a user interface, adapted to an electronic device, comprising:
creating a database, which is configured to store a plurality of combinations of at least two shapes;
detecting touches of a first touching object and a second touching object in an idle mode;
obtaining shapes, capacitance values, and contact times corresponding to the first touching object and the second touching object;
determining whether the combination of the shapes of the first touching object and the second touching object conform to one of the combinations stored in the database or not when the capacitance values corresponding to the first touching object and the second touching object are within a predetermined range, and the contact times are over a predetermined time;
generating a first sensing signal when the combination of the shapes of the first touching object and the second touching object conform to one of the combinations stored in the database;
receiving the first sensing signal by a processing unit; and
enabling a first application program;
wherein after the first application program is enabled, the first application program will be disabled and a second application program will be enabled by the processing unit when the capacitance values are lower than the predetermined range.

8. The method as claimed in claim 7, further comprising:
generating a second sensing signal when the combination of the shapes of the first touching object and the second touching object conform to another combination stored in the database;
receiving the second sensing signal by the processing unit; and
enabling a second application program third application program.

9. The method as claimed in claim 7, further comprising:
generating the first sensing signal according to the locations of the first touching object and the second touching object.

10. A method for operating a user interface, adapted to an electronic device, comprising:
creating a database, which is configured to store a plurality of combinations of at least two shapes;
detecting touches of a first touching object and a second touching object in an idle mode;
obtaining object information corresponding to the first touching object and the second touching object, wherein the object information comprises shapes, capacitance values, and contact times corresponding to the first touching object and the second touching object;
receiving the object information by a processing unit;
determining whether the combination of the shapes of the first touching object and the second touching object conform to one of the combinations stored in the database or not when the capacitance values corresponding to the first touching object and the second touching object are within a predetermined range, and the contact times are over a predetermined time;
enabling a first application program when the combination of the shapes of the first touching object and the second touching object conform to one of the combinations stored in the database;
wherein after the first application program is enabled, the first application program will be disabled and a second application program will be enabled by the processing unit when the capacitance values are lower than the predetermined range.

11. The method as claimed in claim 10, further comprising:
enabling a third application program when the combination of the shapes of the first touching object and the second touching object conform to another combination stored in the database.

12. The method as claimed in claim 10, further comprising:
enabling the first application program according to the locations of the first touching object and the second touching object.

13. An electronic device suite, comprising:
a protective case, comprising:
a front cover, comprising a first sensing object and a second sensing object, wherein the first sensing object is coupled to the second sensing object by a conductive element; and
a back cover, coupled to the front cover;
an electronic device, arranged on the front cover, comprising;
a storage unit, configured to store a plurality of combinations of at least two shapes;
a touch-sensing unit, configured to detect touches of a first touching object and a second touching object in an idle mode, and to generate a sensing signal when the capacitance values corresponding to the first touching object and the second touching object are within a predetermined range over a predetermined time, and the combination of the shapes of the first touching object and the second touching object conform to one of the combinations stored in the storage unit; and
a processing unit, configured to enable an application program according to the sensing signal.

14. The electronic device suite as claimed in claim 13, wherein the first sensing object and the second sensing object are disposed beneath the front cover.

15. The electronic device suite as claimed in claim 13, wherein the back cover further comprises a third sensing object coupled between the first sensing object, the second sensing object, and a ground.

* * * * *